June 8, 1926.
W. C. KERN ET AL
DAMPER
Filed March 20, 1924
1,587,839
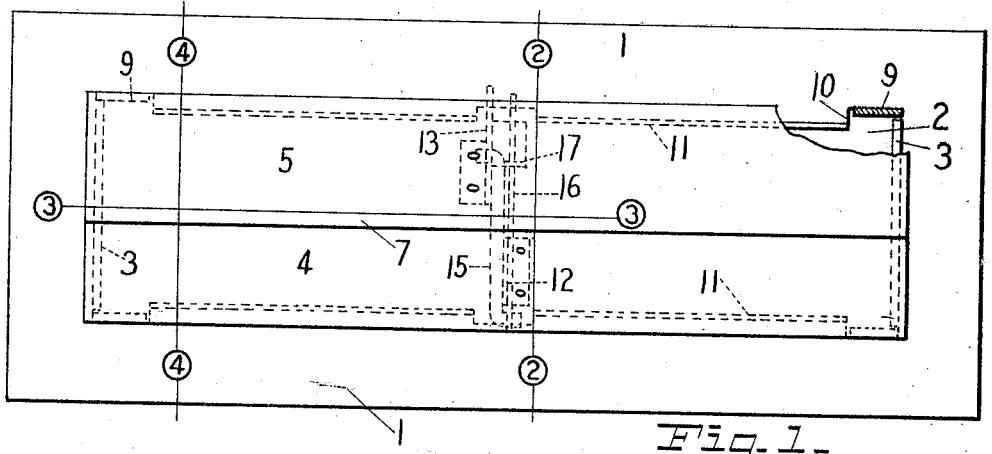
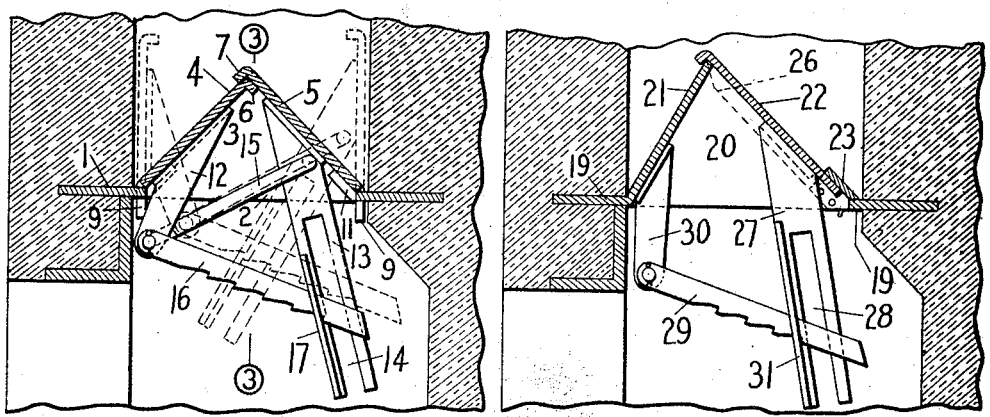
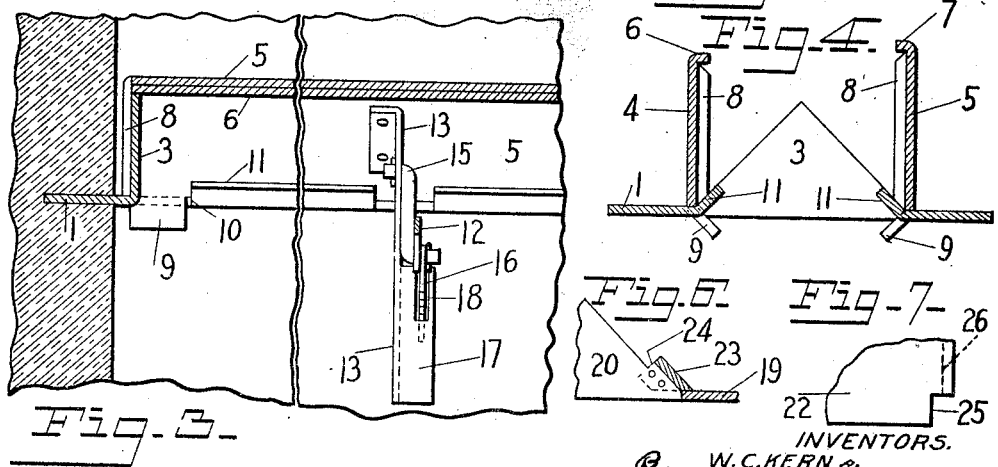
INVENTORS.
W. C. KERN AND
E. H. KERN
ATTORNEY.

Patented June 8, 1926.

1,587,839

UNITED STATES PATENT OFFICE.

WILLIAM C. KERN AND ESTEY A. KERN, OF DAYTON, OHIO.

DAMPER.

Application filed March 20, 1924. Serial No. 700,468.

This invention relates to dampers and more particularly to dampers for use with fireplaces and the like.

One object of the invention is to provide a damper of this kind which will be simple in its construction, easily operated, inexpensive of production, and of such a character that it will not be distorted or otherwise affected by the heat in such a manner as to interfere with its operation.

A further object of the invention is to provide an improved operating device for such a damper.

A further object of the invention is to provide an actuating device for such a damper having means for locking the damper in adjusted positions, which locking means will be automatically released when the actuating device is operated.

Other objects of the invention will appear as the device is described in detail.

In the accompanying drawings Fig. 1 is a top plan view of a damper embodying our invention, partly broken away; Fig. 2 is a section taken on the line 2—2 of Fig. 1; Fig. 3 is a section taken on the line 3—3 of Fig. 2 and partly broken away; Fig. 4 is a sectional view taken on the line 4—4 of Fig. 1, showing the damper plates in their open positions; Fig. 5 is a transverse sectional view of a modified form of the damper; Fig. 6 is a detail view, partly in section, of the pivotal connection between the damper plate and the base of the damper shown in Fig. 5; and Fig. 7 is a detail view of a portion of the damper plate of Fig. 5.

In these drawings we have illustrated certain embodiments of our invention and have shown the same applied to dampers of the dome type and designed primarily for use as a fireplace damper but it will be understood that the invention may take various forms and may be applied to dampers of various kinds.

As shown in these drawings the damper comprises a base structure consisting of a plate adapted to be mounted in the masonry of the flue of the fireplace and having an opening of a relatively large size. Extending upwardly and inwardly from the lateral edges of this opening are two plates, one or both of which may be pivotally mounted on the base structure, and which are adapted to be brought into engagement at their upper edges to close the damper and to be separated to open the damper. The base structure further comprises end plates extending upwardly from the respective ends of the opening therein and preferably having their edges inclined to conform to the closed position of the damper plates. The pivotal plate, or plates, rests loosely upon the base structure and has no positive connection therewith, the base structure and the damper plate having interlocking parts to hold the damper plate against endwise displacement, thereby providing a very efficient pivotal connection between the damper plate and the base structure which will at all times be free and easy of operation, which is inexpensive of construction, and which can be easily assembled and disassembled. Associated with these plates is an actuating device for closing the damper which comprises means for locking the pivotal plate or plates in adjusted positions.

In that form of the device shown in Figs. 1 to 4, the base structure comprises a base plate 1, substantially rectangular in shape and having a central opening 2. At the ends of this opening are upwardly extending walls or end plates 3 which are preferably triangular in shape and are rigidly secured to the base plate. Preferably the base structure is formed from sheet metal and the end plates 3 are formed of the metal which is removed from the central opening 2. Extending upwardly from the base plate along each side of the opening 2 are plates 4 and 5, both plates being, in the present instance, pivotally connected with the base structure and constituting damper plates. These plates are of such a character that when in their closed positions the upper edge of one plate will overlap the upper edge of the other plate. If desired, these plates may have their upper edges flanged, as shown at 6 and 7, to tightly close the joint between them. The plates when in their closed positions preferably rest upon the inclined edges of the end plates 3 and they are provided at their ends with flanges 8 which overlap the adjacent edges of the end plates 3. Each damper plate is provided at its lower edge and near the ends thereof with depending projections or lugs 9 which extend through slots 10 formed in the base plate at the lateral edges of the opening and near the ends thereof. In the present instance, these slots open into the main opening 2 for a portion of their length but they extend slightly beyond the end plates 3 so that the lugs 9 not only serve to hold the damper plates against endwise movement but also hold the same against inward movement so that the two pivot lugs are always in longitudinal alinement. The base plate is provided at the lateral edges of the opening 2 with inwardly and upwardly extending flanges 11 which overlap the lower edges of the damper plates when the latter are in their closed positions and serve to close the joint between the plates and the base. A suitable actuating device is provided for adjusting the damper plates to control the draft through the flue and this device may take various forms but, as here shown, we have rigidly secured to the damper plates 4 and 5 arms 12 and 13 which extend downwardly therefrom and when the damper plates are in their closed positions diverge slightly so that the arms are at all times spaced one from the other. The arm 13 is provided in its lower portion with a longitudinal slot 14 adapted to receive a suitable actuating implement, such as the bent end of a poker, to manipulate the damper. The actuating arm 13 is suitably connected with the damper plate 4 to cause the two plates to move substantially in unison and, in the present construction, a link 15 is pivotally connected with the arm 12 near its lower end and with the arm 13 near its upper end, the arrangement being such that the movement of the arm 13 will be imparted to both damper plates. In order to lock the two damper plates in adjusted positions we have connected with the damper plate 4 a locking member which, in the present instance, is in the form of a notched bar 16 pivotally connected with the lower end of the arm 12 and extending across the slotted end of the arm 13, which arm is provided with a part cooperating with the locking member to secure the two arms and consequently the two damper plates in adjusted positions. In the present instance, the arm 13 has a laterally extending plate or flange 17 which is slotted at 18 to receive the notched bar 16, the notches engaging over the lower edge of the slot to hold the parts in adjusted positions. It will be noted that the end of this notched bar extends across the slot 14 and will be engaged by the actuating implement or poker when the latter is inserted in the slot, thus raising the notched bar out of engagement with the edge of the locking flange 17 and releasing the two arms so that the damper plates may move to their closed positions. This actuating and locking device is not only very simple in its construction but it is of such a character and so arranged that it is substantially concealed when installed in the fireplace, only the lower end of the actuating arm 13 being visible from the front of the fireplace.

In that form of the device shown in Figs. 5, 6 and 7, only one of the upwardly extending plates is movable. As there shown, the base structure comprises a plate 19 having a central opening and provided at the ends of that opening with upwardly extending end plates or walls 20. Plates 21 and 22 extend upwardly and inwardly from the respective lateral edges of the opening in the base structure but the plate 21 is rigidly secured to and, in the present instance, formed integral with the base plate so that it occupies always a fixed position. As here shown, this plate extends upwardly at a sharper angle than does the plate 22 but this is a matter of preference and any suitable arrangement may be had. The plate 22 is pivotally supported on the base structure at that edge of the opening opposite the plate 21. It rests loosely upon the base structure and the damper plate 22 and base structure have interlocking parts to hold the damper plate against endwise displacement. As here shown, the base structure also comprises a flange 23 extending inwardly and upwardly at the lower edge of the pivoted damper plate. This damper plate rests upon the adjacent inclined edges of the end walls 20, its downward movement being limited by the flange 23 which extends across the edges of the end walls, thereby forming a seat, as shown at 24 in Fig. 6, to receive the edge of the damper plate. Each lower corner of the damper plate is cut away, as shown at 25 in Fig. 7, and the narrow portion of the plate extends inwardly between the end walls 20 and projects beneath the overlapping flange 23. The pivoted damper plate also has at its ends flanges 26 which overlap the edges of the respective end walls 20.

The actuating and locking device is similar to that above described except that the connection between the two plates is omitted as only one of the plates is to be moved. As here shown, the actuating device comprises an arm 27 rigidly secured to the pivoted plate 22 extending downwardly therefrom and having its lower edge slotted, as shown at 28, to receive the actuating implement by means of which the damper plate may be moved about its pivotal support on the base structure. The locking member 29 is in the form of a notched bar pivotally connected with the base structure and, in the present instance, pivotally mounted on the lower end of an arm 30 which is rigidly secured to the fixed plate 21. This locking bar extends through a slotted flange 31 on the actuating arm 27 which cooperates therewith to secure the pivoted plate 22 in adjusted positions.

While we have shown and described certain embodiments of our invention we wish it to be understood that we do not desire to be limited to the details thereof as various modifications may appear to a person skilled in the art.

Having now fully described our invention, what we claim as new and desire to secure by Letters Patent, is:

1. In a damper, a base structure having an opening therethrough and having walls extending upwardly at the respective ends of said opening, said base structure having laterally extending recesses near the respective ends of one edge of said opening, and plates extending upwardly and inwardly from said base structure at the respective lateral edges of said opening, one of said plates resting loosely on said base structure for pivotal movement thereon and having lugs extending through said recesses in said base structure to hold said plate against endwise displacement.

2. In a damper, a base structure having an opening therethrough and having walls extending upwardly at the respective ends of said opening, and plates extending upwardly and inwardly from said base structure at the respective lateral edges of said opening, one of said plates resting loosely on said base structure for pivotal movement thereon, said plate and said base structure having interlocking parts to hold said plate against endwise displacement, said base structure having a flange extending inwardly and upwardly and overlapping the edge of said pivotal plate.

3. In a damper, a base structure having an opening therethrough and having walls extending upwardly at the respective ends of said opening, and plates extending upwardly and inwardly from said base structure at the respective lateral edges of said opening, one of said plates resting loosely on said base structure for pivotal movement thereon, and having projections extending loosely through openings therein to hold said pivoted plate against displacement.

4. In a damper, a base plate having an opening therethrough, and having slots near the respective ends of one edge of said opening, and plates extending upwardly and inwardly from said base plate at the respective lateral edges of said opening, one of said plates resting loosely on said base plate adjacent to said slots and having projections extending through the respective slots.

5. In a damper, a base plate having an opening therethrough and having slots near the respective ends of each lateral edge of said opening, and damper plates resting loosely on said base plate at the respective lateral edges of said opening and having lugs extending through the respective slots.

6. In a damper, a base plate having an opening therethrough and having slots near the respective ends of each lateral edge of said opening, and damper plates resting loosely on said base plate at the respective lateral edges of said openings and having lugs extending through the respective slots, and end plates extending upwardly at the respective ends of said opening and each having its edges converging upwardly.

7. In a damper, a base structure having an opening therethrough, damper plates pivotally mounted at the respective lateral edges of said opening, actuating arms rigidly secured to the respective damper plates and spaced one from the other, and means for connecting said arms one to the other, whereby operative movement imparted to one of said actuating arms will cause both damper plates to be actuated.

8. In a damper, a base structure having an opening therethrough, damper plates pivotally mounted at the respective lateral edges of said opening, an arm rigidly secured to one of said damper plates, and a link floating connection between said arm and the other damper plate to cause said damper plates to move in unison.

9. In a damper, a base structure having an opening therethrough, damper plates pivotally mounted at the respective lateral edges of said opening, an arm secured to one of said damper plates, a link floating connection between said arm and the other damper plate, and an actuating member secured to said other damper plate.

10. In a damper, a base structure having an opening therethrough, damper plates pivotally mounted at the respective lateral edges of said opening, actuating arms rigidly secured to the respective damper plates, and a floating link connecting said arms one to the other.

11. In a damper, a base structure having an opening therethrough, damper plates pivotally mounted at the respective lateral edges of said opening, actuating arms rigidly secured to the respective damper plates, and spaced one from the other, means for connecting said arms one to the other, and a locking member to engage one of said arms to secure said damper plates in their adjusted positions.

12. In a damper, a base structure having an opening therethrough, damper plates pivotally mounted at the respective lateral edges of said opening, actuating arms secured to the respective damper plates, a floating link connecting said arms one to the other, and a locking bar pivotally connected with one of said arms, the other of said arms having a part cooperating with said locking bar to secure said damper plates in adjusted positions.

13. In a damper, a base structure having an opening therethrough, damper plates pivotally mounted at the respective lateral edges of said opening, actuating arms secured to the respective damper plates, a link connecting said arms one to the other, a lateral projection carried by one of said arms and having a slot, and a locking bar pivotally connected with the other of said arms, extending through said slotted projection, and having notches to engage the edge thereof.

14. In a damper, a base structure having an opening therethrough, damper plates pivotally mounted at the respective lateral edges of said opening, actuating arms secured to the respective damper plates, a link connecting said arms one to the other, one of said arms having a longitudinal slot near the free end thereof, a locking bar pivotally mounted on the other arm and intersecting the slot in the first mentioned arm, said slotted arm having a part cooperating with said locking bar to secure said damper plates in adjusted positions.

15. In a damper, a base structure having an opening therethrough, damper plates pivotally mounted at the respective lateral edges of said opening, actuating arms secured to the respective damper plates, the actuating arm which is secured to one of said plates having a longitudinal slot, means for connecting said plates one to the other to cause them to move in unison, a locking member connected with the other of said arms and having a part arranged adjacent to the slot in the first mentioned arm, said first mentioned arm having a part cooperating with said locking member to secure said damper plates in adjusted positions.

16. In a damper, a base structure having an opening therethrough, damper plates pivotally mounted at the respective lateral edges of said opening, an actuating arm secured to one of said plates and having a part to be engaged by an actuating implement, a locking member connected with the other of said plates and arranged to be engaged by said implement when the latter is in engagement with said part of said arm, said arm having a part cooperating with said locking member to hold said plates in their adjusted positions.

17. In a damper, a base structure having an opening therethrough, plates extending upwardly and inwardly from the respective lateral edges of said opening, one of said plates being pivotally connected with said base structure, an arm secured to said pivoted plate and having a part to be engaged by an actuating implement, a locking member connected with the other of said plates and arranged to be engaged by said implement when the latter is in engagement with said part of said arm, said arm having a part to cooperate with said locking member to hold said pivoted plate in its adjusted position.

18. In a damper, a base structure having an opening therethrough, plates extending upwardly and inwardly from the respective lateral edges of said opening, one of said plates being pivotally connected with said base structure, an arm secured to said pivoted plate and having a slot extending lengthwise thereof, a locking bar pivotally connected with the other plate and intersecting the slot in said arm, said arm having a part cooperating with said locking bar to secure said pivoted plate in adjusted positions.

In testimony whereof, we affix our signatures hereto.

WILLIAM C. KERN.
ESTEY A. KERN.